(12) United States Patent
Yeh

(10) Patent No.: US 7,626,446 B2
(45) Date of Patent: Dec. 1, 2009

(54) CHARGE PUMP CAPABLE OF ENHANCING POWER EFFICIENCY AND OUTPUT VOLTAGE

(75) Inventor: Cheng-Chung Yeh, Taipei (TW)

(73) Assignee: Sitronix Technology Corp., Hsinchu County (TW)

( * ) Notice: Subject to any disclaimer, the term of this patent is extended or adjusted under 35 U.S.C. 154(b) by 0 days.

(21) Appl. No.: 12/029,836

(22) Filed: Feb. 12, 2008

(65) Prior Publication Data
US 2009/0128228 A1  May 21, 2009

(30) Foreign Application Priority Data
Nov. 16, 2007  (TW) .............................. 96146483 A

(51) Int. Cl.
*G05F 1/10* (2006.01)
(52) U.S. Cl. ..................................................... 327/536
(58) Field of Classification Search ................. 327/535, 327/536, 537
See application file for complete search history.

(56) References Cited

U.S. PATENT DOCUMENTS

| | | | | |
|---|---|---|---|---|
| 6,515,535 | B2 * | 2/2003 | Myono | 327/536 |
| 6,970,035 | B2 * | 11/2005 | Tanimoto | 327/536 |
| 7,023,260 | B2 * | 4/2006 | Thorp et al. | 327/536 |
| 7,116,156 | B2 * | 10/2006 | Myono et al. | 327/536 |
| 7,427,891 | B2 * | 9/2008 | Sakurai et al. | 327/536 |
| 7,466,188 | B2 * | 12/2008 | Fifield | 327/536 |

* cited by examiner

*Primary Examiner*—Jeffrey S Zweizig
(74) *Attorney, Agent, or Firm*—Ming Chow; Sinorica, LLC

(57) ABSTRACT

The present invention relates to a charge pump capable of enhancing power efficiency and output voltage, which comprises a pump capacitor, a switching module, a first switch, a first buffer, a first switch, and an output capacitor. The switching module is coupled to a first terminal of the pump capacitor. The first switch is coupled between a second terminal of the pump capacitor and a supply voltage. The first buffer receives a first input signal and produces a control signal for controlling the first switch to turn on or cut off. The level of the first input signal ranges between a first voltage and a second voltage, wherein the first and the second voltages are related to the gate voltage of the first switch. The gate voltage of the first switch is a multiple, which is greater than one, of the supply voltage. Thereby, the impedance of the switch is reduced, and hence the power efficiency of the charge pump, the output voltage level, and the area efficiency of integrated circuits are improved.

27 Claims, 7 Drawing Sheets

CHARGE PUMP CAPABLE OF ENHANCING POWER EFFICIENCY AND OUTPUT VOLTAGE

FIELD OF THE INVENTION

The present invention relates generally to a charge pump, and particularly to a charge pump capable of enhancing power efficiency and output voltage.

BACKGROUND OF THE INVENTION

With advancement in technologies, people's lives are getting increasingly convenient. In work or in entertainment, people cannot do without electronic products. In view of the trend, many products are developed to make people enjoy the convenience brought by the electronic products.

In addition, because the functions of modern electronic products, for example, the third-generation (3G) mobile phones, are more and more powerful, manufacturers spend all their strength on integrating new functions, such as MP3 players, digital cameras, GPS, TV systems, broadcasting systems, image short messages, video phones, and credit card functions, to cellular phones. When more functions are integrated, the quality and quantity requirements on power supplies are raised accordingly. On the other hand, cellular phones are becoming gradually into consumables in the market, easy to be replaced with a short life cycle. If the product is not developed in the shortest time to meet the demands of consumers, then the profit margin will definitely shrink. Thereby, engineers must be acquainted with the advantages and disadvantages of various power management ICs as well as with the usage methods thereof, so that maximum profit margins can be created in the shortest time.

Charge pumps based on switched capacitors are utilized in the power management of current general portable devices. Because of their relatively low EMI/EMC, they are widely applied to various electronic products particularly handheld electronic products such as PDAs and cellular phones. With the development of handheld electronic products, different functions are gradually integrated into a single chip (SOC). The voltage levels of the power supplies in the chips are diverse. In general, the battery of a handheld electronic product can only supply a single voltage Vsup of around 2.7V. Due to functional requirements of the products, it is necessary to convert the around-2.7V voltage to various voltages by means of a charge pump. Voltage doublers and voltage inverters are utilized most frequently. FIGS. 1A and 1B show a circuit diagram and timing diagrams of a doubler charge pump according to the prior art, respectively. As shown in the figure, the circuit comprises a first switch 10', a pump capacitor 11', a second switch 12', a third switch 13', a fourth switch 14', an output capacitor 15', a first buffer 20', a second buffer 21', a third buffer 22', and a fourth buffer 23'. The first switch 10' is coupled to a supply voltage VDD and a first terminal of the pump capacitor 11'. A second terminal of the pump capacitor 11' is coupled to the second and third switches 12', 13'. The second switch 12' is coupled between the supply voltage VDD and the second terminal of the pump capacitor 11'. The third switch 13' is coupled between the second terminal of the pump capacitor 11' and the ground. The fourth switch 14' is coupled between the first terminal of the pump capacitor 11' and a terminal of the output capacitor 15'. The output capacitor 15' is coupled between the fourth switch 14' and the ground. The buffers 20', 21', 22', 23' are coupled to the first, the second, the third, and the fourth switches 11', 12', 13', 14', respectively, for controlling the switches. The output of the doubler charge pump is approximately twice the supply voltage VDD, which is around 2.7V.

If the reliability of fabrication is allowed, generally, 5V-MOS devices are used to implement the switched-capacitor charge pumps. The gate-to-source voltage ($V_{GS}$) of the MOS device used as capacitor switch is only Vsup. When the drain-to-source voltage ($V_{DS}$) is known small, that is, $V_{DS}$<<2($V_{GS}$–Vth), the relation between the on-resistance ($R_{MOS}$) of a MOS switch and $V_{GS}$ is:

$$R_{MOS} \propto [(W/L)*(V_{GS}-Vth)]^{-1}, \text{ when } V_{DS}<<2(V_{GS}-Vth)$$

where W is the channel width of the MOS switch, L is the channel length of the MOS switch, and Vth is the threshold voltage of the MOS switch. In FIG. 1B, the input and output waveforms of the inverting buffers are shown. Assuming the threshold voltage of the 5V PMOS is –Vthp and the threshold voltage of the 5V NMOS is Vthn, according to the equation described above, the on-resistances of the first, the second, the third, and the fourth switches 11', 12', 13', 14' are $$R_{MOS,10'} \propto [(W_{10'1}/L_{10'})*(|V_{GS,10'}|-Vthp)]^{-1}$$
$$= [(W_{10'}/L_{10'})*(VDD-Vthp)]^{-1}$$

$$R_{MOS,12'} \propto [(W_{12'}/L_{12'})*(|V_{GS,12'}|-Vthp)]^{-1}$$
$$= [(W_{12'}/L_{12'})*(VDD-Vthp)]^{-1}$$

$$R_{MOS,13'} \propto [(W_{13'}/L_{13'})*(V_{GS,13'}-Vthn)]^{-1}$$
$$= [(W_{13'}/L_{13'})*(VDD-Vthn)]^{-1}$$

$$R_{MOS,14'} \propto [(W_{14'}/L_{14'})*(|V_{GS,14'}|-Vthp)]^{-1}$$
$$= [(W_{14'}/L_{14'})*(Output1-Vthp)]^{-1}$$
$$= [(W_{14'}/L_{14'})*(AVDD-Vthp)]^{-1}$$
$$= [(W_{14'}/L_{14'})*(2*VDD-Vthp)]^{-1}$$

According to the equations above, it is known that the on-resistances of the first, the second, and the third switches 11', 12', 13' are inversely proportional to (VDD–Vth), and thereby are greater than that of the fourth switch. Hence, greater power will be consumed, and worse output voltage level is given. Besides, greater circuit areas will be needed during IC fabrication.

Likewise, FIG. 2A shows a circuit diagram and timing diagrams of an inverting charge pump according to the prior art. As shown in the figure, the difference between FIG. 2A and FIG. 1A is that in the present figure, a fifth switch 30' is coupled to the ground, a fifth buffer 32' is coupled to the fifth switch 30' and receives input signals ranging from the supply voltage VDD to a negative supply voltage VCL, and a sixth buffer 34' is coupled to the sixth switch 36' and receives input signals ranging from the supply voltage VDD to a negative supply voltage VCL. The fifth switch 30', a seventh switch 38', and an eighth switch 39' have the same problems of the circuit in FIG. 1A.

Accordingly, the present invention provides a novel charge pump capable of enhancing power efficiency and output voltage, which utilizes 2*Vsup as $V_{GS}$ of the MOS device used for switching the capacitor. Thereby, the on-resistance of the MOS device is reduced effectively while improving the power efficiency of the charge pump, the output voltage level, and the area efficiency of integrated circuits.

SUMMARY

An objective of the present invention is to provide charge pump capable of enhancing power efficiency and output voltage, which can increase the gate voltage of the switch, reduce the impedance of the switch, and thereby can improve the power efficiency of the charge pump, the output voltage level, and the area efficiency of integrated circuits.

Another objective of the present invention is to provide charge pump capable of enhancing power efficiency and output voltage, which utilizes the dynamic voltage between two charge pumps in the circuit to increase the gate voltage of the switch. Thereby, the impedance of the switch is reduced without extra power supply circuits, and the circuit area and thus costs can be saved.

The charge pump capable of enhancing power efficiency and output voltage according to the present invention comprises a pump capacitor, a switching module, a first switch, a first buffer, a first switching mechanism, and an output capacitor. The switching module is coupled to a first terminal of the pump capacitor. The first switch is coupled between a second terminal of the pump capacitor and a supply voltage. The first buffer receives a first input signal and produces a control signal for controlling the first switch to turn on or cut off. The level of the first input signal ranges between a first voltage and a second voltage, wherein the first and the second voltages are related to the gate voltage of the first switch. The gate voltage of the first switch is a multiple, which is greater than one, of the supply voltage. The first switching mechanism is coupled to the first switch and the pump capacitor for switching the pump capacitor and outputting the pump voltage. The output capacitor is coupled to the second switch and the pump capacitor for stabilizing the output pump voltage.

In addition, the second voltage used as one of voltage limit of the first input signal received by the first switch is the pump voltage of the other charge pump. Thereby, by means of the dynamic voltage produced inside the circuit, the gate voltage of the switch is increased, the impedance of the switch is reduced, and thereby the power efficiency of the charge pump, the output voltage level, and the area efficiency of integrated circuits are improved.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
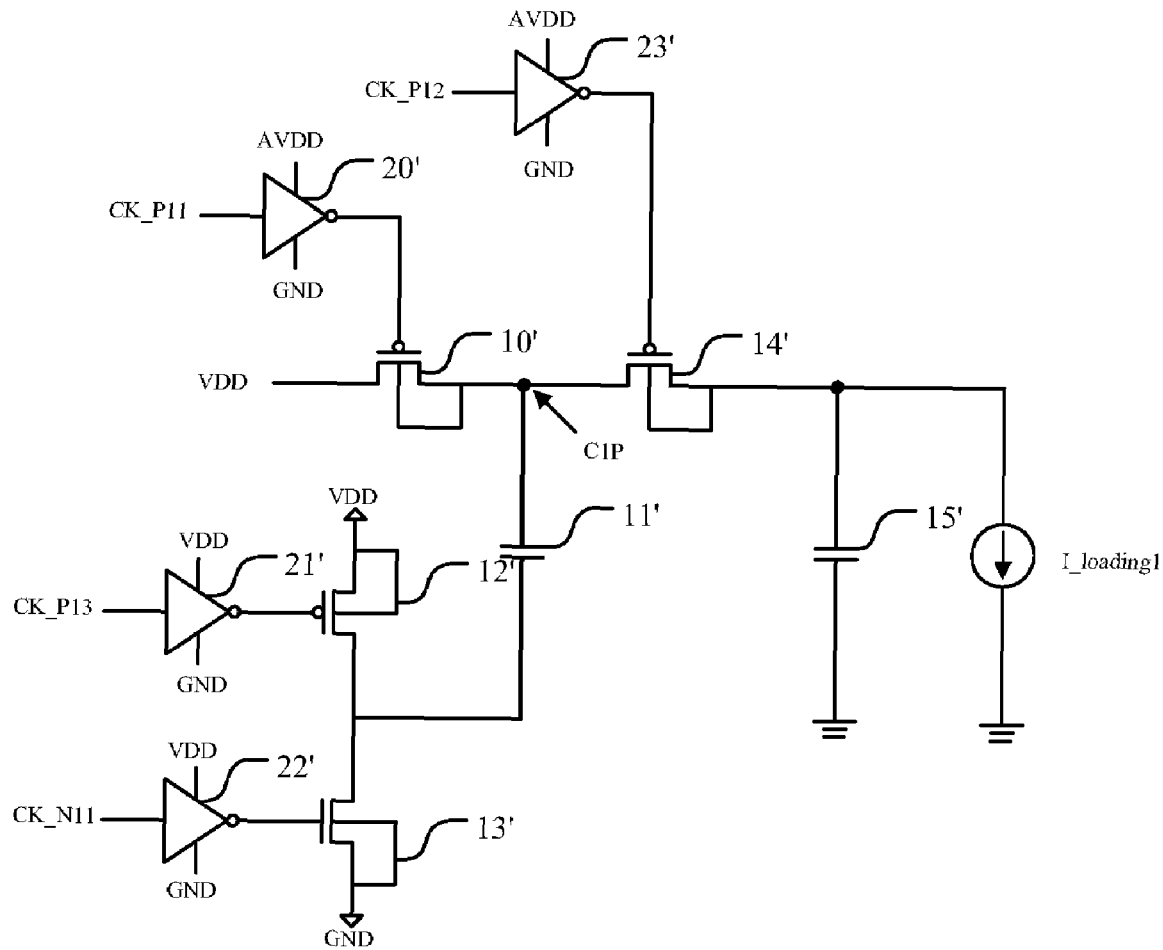
FIG. 1A shows a circuit diagram of a doubler charge pump according to the prior art.
Figure 1B:
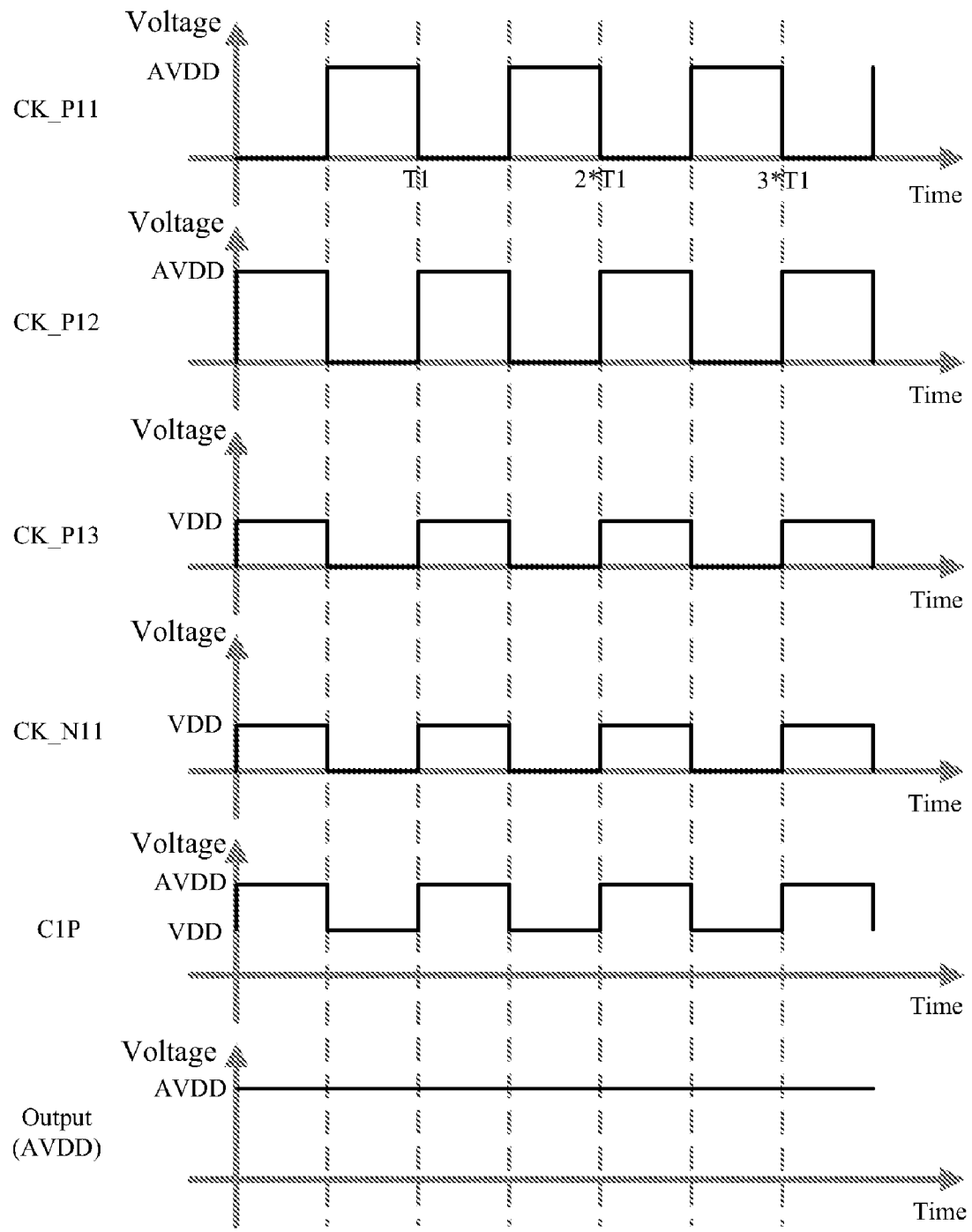
FIG. 1B shows timing diagrams of a doubler charge pump according to the prior art.
Figure 2A:
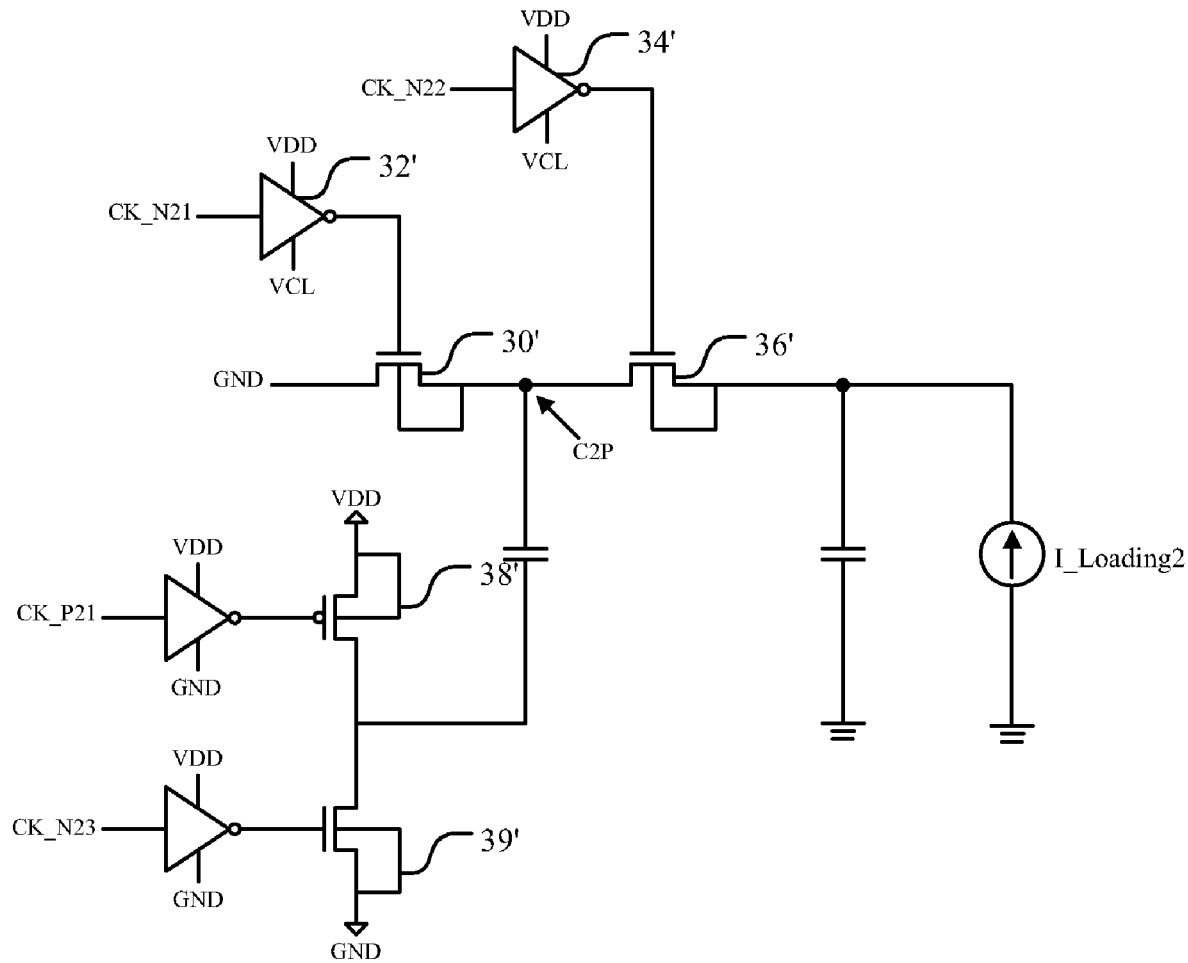
FIG. 2A shows a circuit diagram of an inverting charge pump according to the prior art.
Figure 2B:
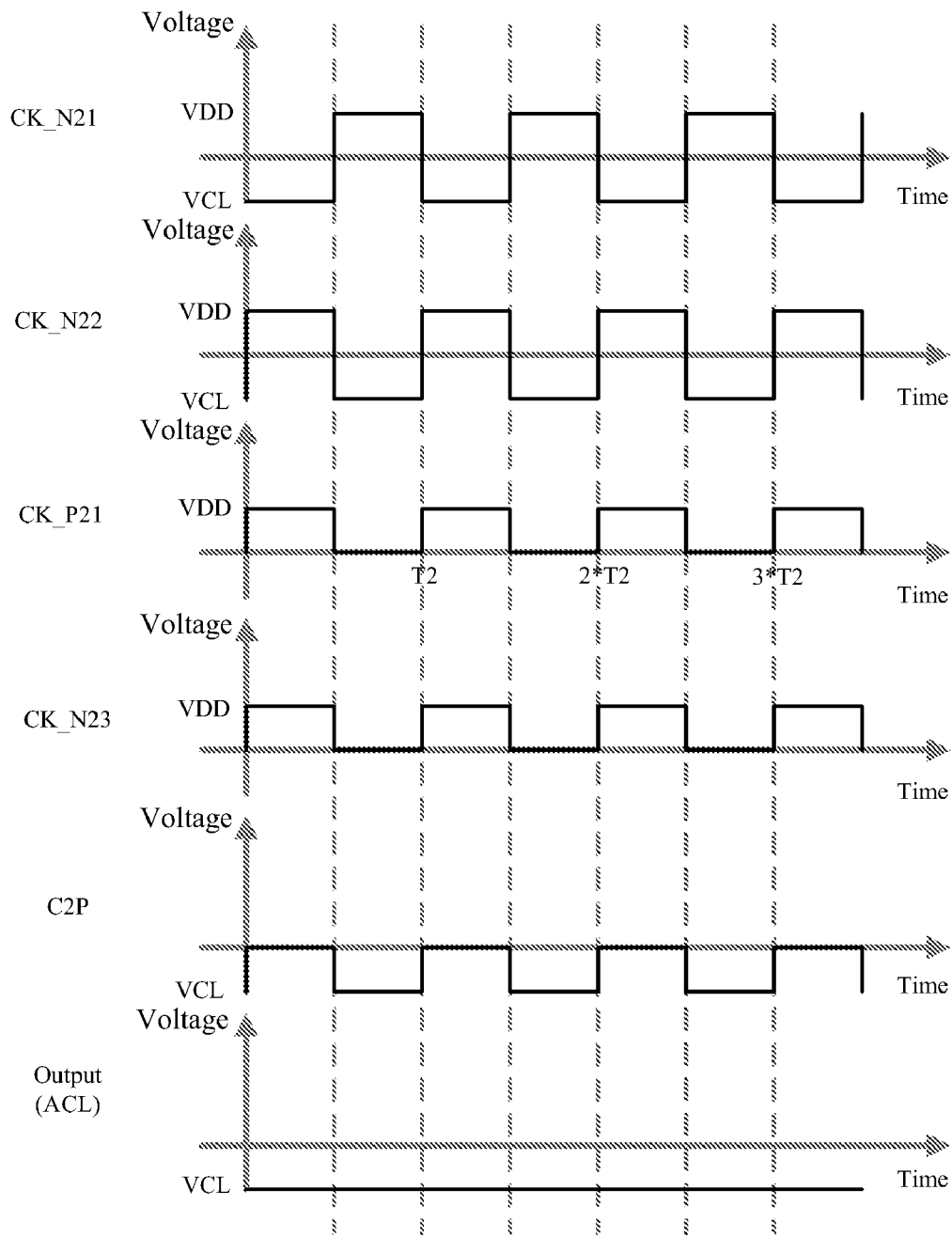
FIG. 2B shows timing diagrams of an inverting charge pump according to the prior art.
Figure 3:
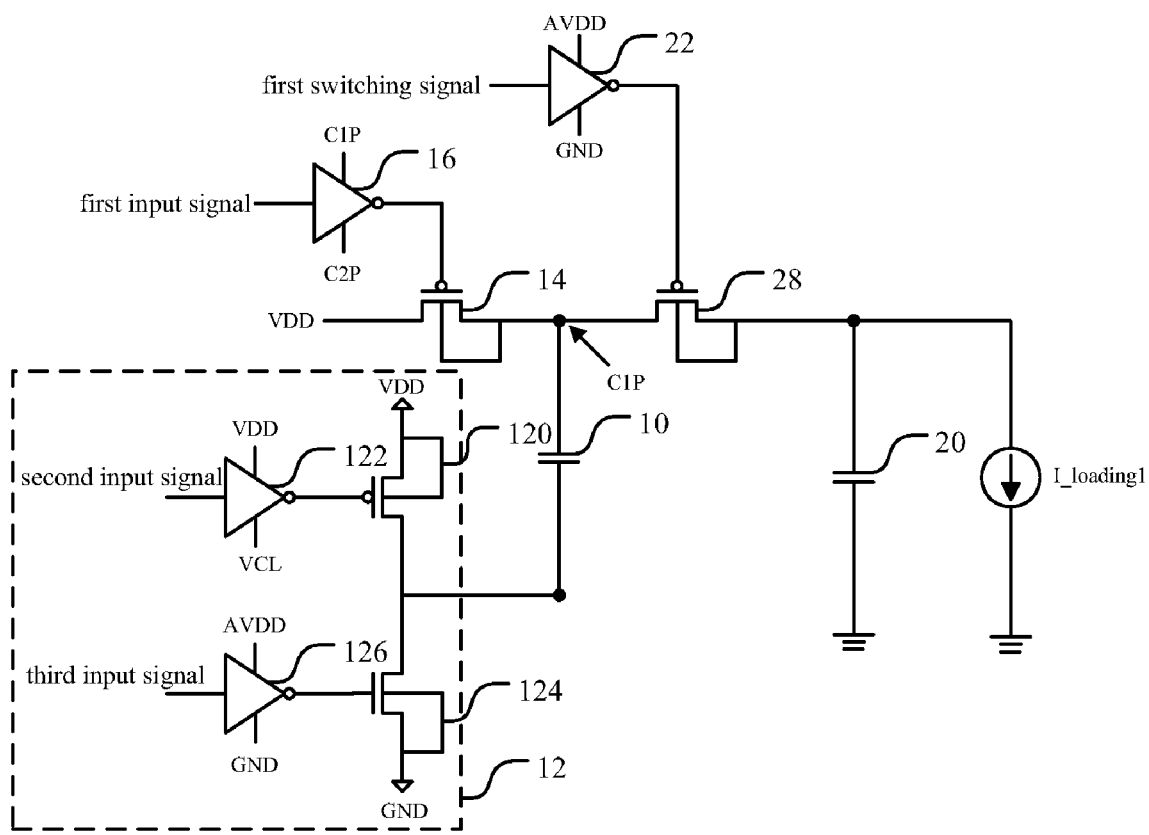
FIG. 3 shows a circuit diagram according to a preferred embodiment of the present invention.
Figure 5:
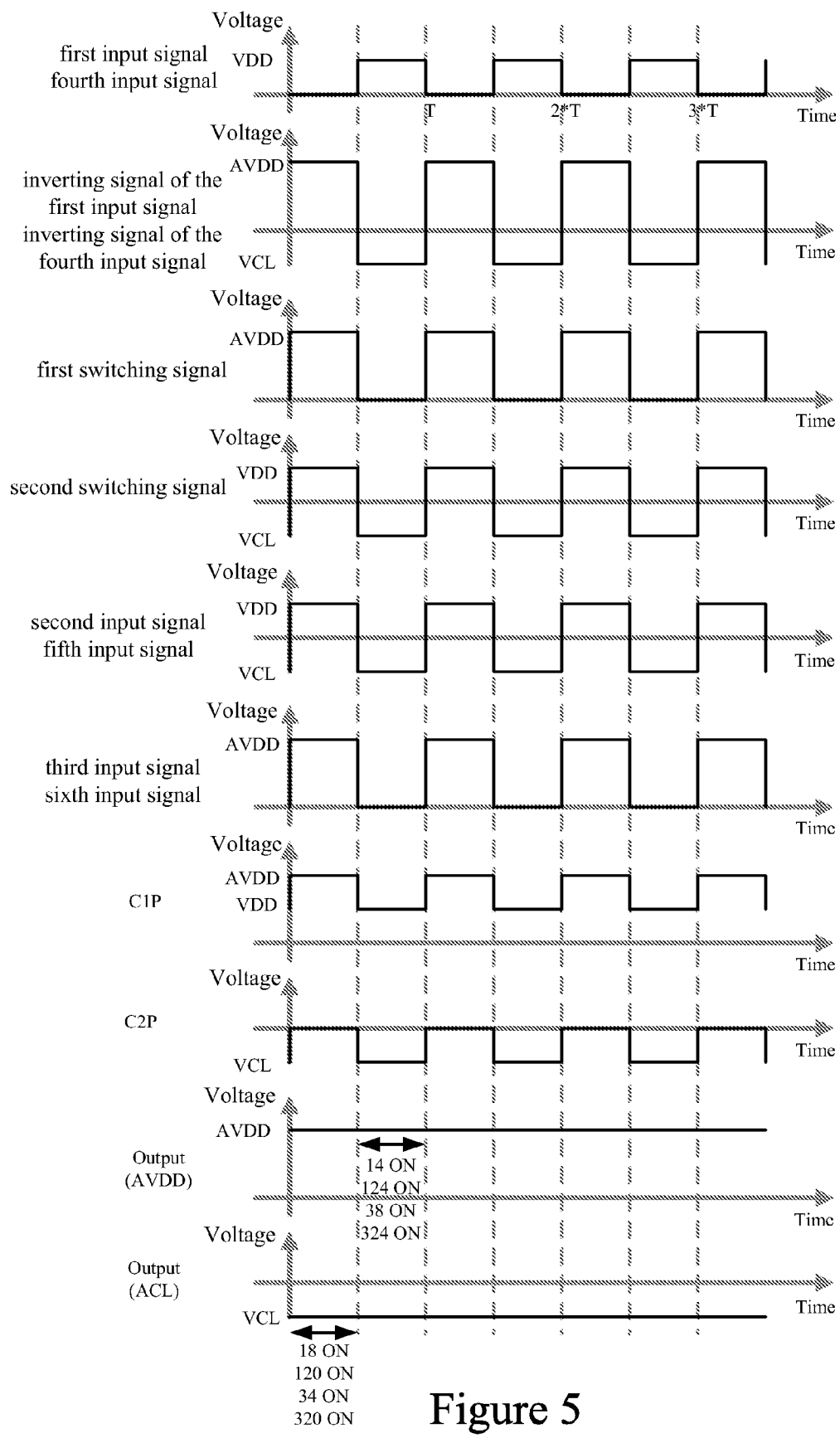
FIG. 5 shows timing diagrams according to a preferred embodiment of the present invention.

FIG. 3 shows a circuit diagram according to a preferred embodiment of the present invention. As shown in the figure, the charge pump capable of enhancing power efficiency and output voltage according to the present invention comprises a first pump capacitor 10, a first switching module 12, a first switch 14, a first buffer 16, a first switching mechanism 18, and a first output capacitor 20. The first switching module 12 is coupled to a first terminal of the first pump capacitor 10. The first switch 14 is coupled between a second terminal of the first pump capacitor 10 and a supply voltage VDD. The first buffer 16 receives a first input signal and produces a control signal for controlling the first switch 14 to turn on or cut off. The level of the first input signal ranges between a first voltage and a second voltage, wherein the first and the second voltages are related to the gate voltage of the first switch 14. The gate voltage of the first switch 14 is a multiple, which is greater than one, of the supply voltage. The first switch 14 is a Metal-Oxide-Semiconductor Field Effective Transistor (MOSFET); and the first buffer 16 is an inverting buffer. When the drain-to-source voltage ($V_{DS}$) is known small, that is, $V_{DS} \ll 2(V_{GS} - Vth)$, the relation between the impedance ($R_{MOS}$) of a MOS switch and $V_{GS}$ is:

$$R_{MOS} \propto [(W/L)*(V_{GS}-Vth)]^{-1}, \text{ when } V_{DS} \ll 2(V_{GS}-Vth)$$

where W is the channel width of the MOS switch, L is the channel length of the MOS switch, and Vth is the threshold voltage of the MOS switch. It is known from the description above that by increasing the gate-to-source voltage ($V_{GS}$) of the first switch 14, the on-resistance of the first switch 14 is reduced, and thereby the power efficiency of the charge pump, the output voltage level, and the area efficiency of integrated circuits are improved. Besides, because the power management of the current portable devices adopts more than one charge pump, according to the present invention, the pump voltage C1P produced by the first pump capacitor 10 and the pump voltage C2P produced by the second pump capacitor 30, which is an inverting charge pump, are used as the first and the second voltages, respectively, of the voltage limits for the first input signal (as shown in FIG. 5). Thereby, by increasing the gate voltage of the first switch 14, which means increasing the gate-to-source voltage of the first switch 14, the impedance of the first switch 14 is reduced as shown in the equation below:

$$R_{MOS,14} \propto [(W_{14}/L_{14})*(|V_{GS,14}|-Vthp)]^{-1}$$
$$= [(W_{14}/L_{14})*(VDD-VCL-Vthp)]^{-1}$$
$$= [(W_{14}/L_{14})*(2*VDD-Vthp)]^{-1}$$

Figure 4:
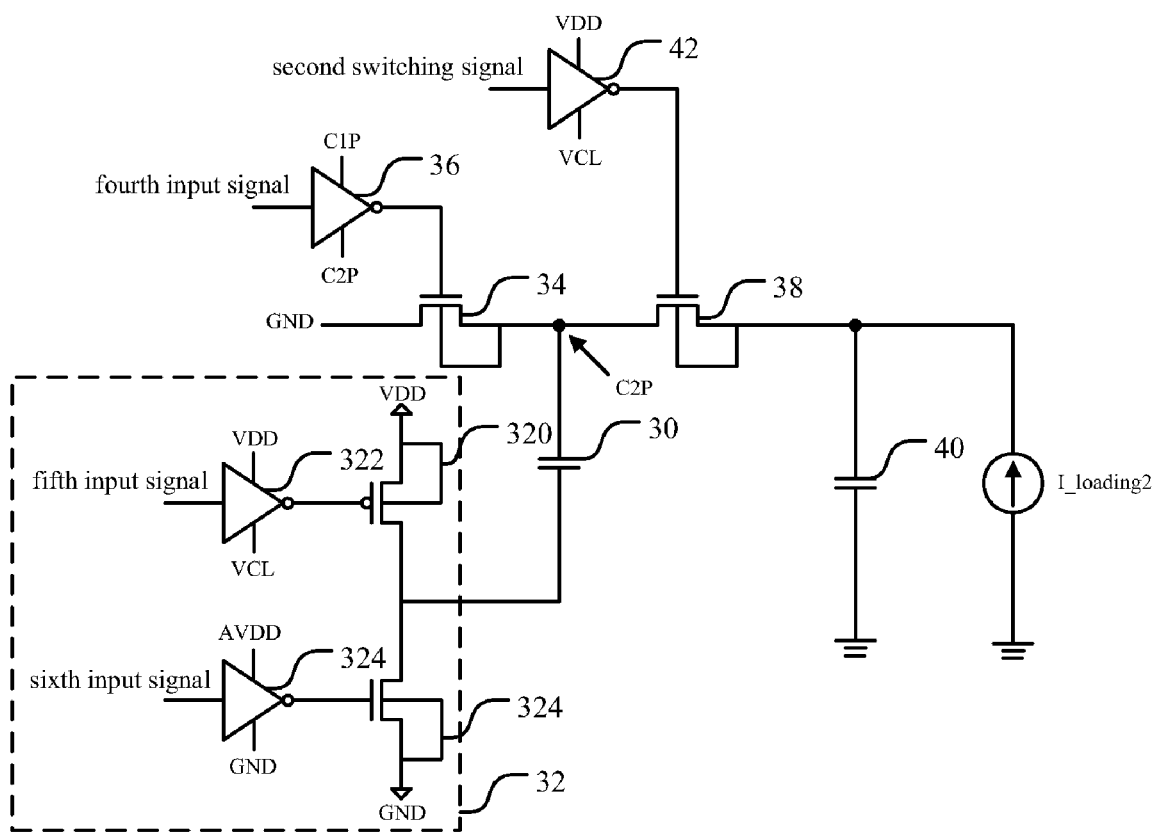
FIG. 4 shows a circuit diagram according to another preferred embodiment of the present invention.

Besides, because the power management of the current portable devices adopts more than one charge pump, according to the present invention, the voltage limit of the first input signal received by the first buffer 16 is provided by another charge pump, which is the pump voltage C2P of the inverting charge pump (as shown in FIG. 4). Thereby, by using the dynamic voltage produced inside the circuit as the gate voltage of the first switch 14, no extra power supply circuit is needed, and the circuit area and thus costs can be saved. The first switching mechanism 18 is coupled to the first switch 14 and the first pump capacitor 10 for switching the first pump capacitor 10 to output the pump voltage C1P. The first output capacitor 20 is coupled to the first switching mechanism 18 and the first pump capacitor 10 for stabilize and output the pump voltage C1P. The first switching mechanism 18 is coupled to a first driving buffer 22, and receives a first switching signal to produce a driving signal for controlling the first switching mechanism 18 to turn on or cut off. The voltage level of the first switching signal is twice the voltage of the supply voltage. Moreover, the first driving buffer 22 is an inverting buffer.

The first switching module 12 further includes a second switch 120, a second buffer 122, a third switch 124, and a third buffer 126. The second switch 120 is coupled to the supply voltage VDD and the first terminal of the first pump capacitor 10. The second buffer 122 is coupled to the second switch 120, and receives a second input signal for controlling the second switching 120 to turn on or cut off. The third switch 124 is coupled to a ground GND and the first terminal of the first pump capacitor 10. The third buffer 126 is coupled to the third switch 124, and receives a third input signal for controlling the third switching 124 to turn on or cut off. The second buffer 122 and the third buffer 126 are inverting buffers. The second switch 120 and the third switch 124 are MOSFETs. Because so, the impedance of the second and the third switches 120, 124 can be reduced by increasing the gate-to-source voltage of the transistors, as described above. The voltage range of the second input signal can be adjusted to be from the supply voltage VDD to −VCL; the voltage range of the third input signal can be adjusted to be from twice the supply voltage VDD to the ground GND (as shown in FIG. 5). Thereby, the impedance of the second and the third switches 120, 124 are:

$$R_{MOS,120} \propto [(W_{120}/L_{120}) * (|V_{GS,120}| - Vthp)]^{-1}$$
$$= [(W_{120}/L_{120}) * (VDD - VCL - Vthp)]^{-1}$$
$$= [(W_{120}/L_{120}) * (2 * VDD - Vthp)]^{-1}$$

$$R_{MOS,124} \propto [(W_{124}/L_{124}) * (V_{GS,124} - Vthn)]^{-1}$$
$$= [(W_{124}/L_{124}) * (AVDD - Vthn)]^{-1}$$
$$= [(W_{124}/L_{124}) * (2 * VDD - Vthn)]^{-1}$$

After adjusting the range of voltage levels of the second and the third input signals, the gate-to-source voltages of the second the third switches 120, 124 are increased to twice the supply voltage VDD, and the impedance of the second and the third switches 120, 124 are reduced accordingly. Thereby, the impedance of the first, the second, and the third switches 14, 120, 124 are reduced simultaneously, and hence the power efficiency of the charge pump, the output voltage level, and the area efficiency of integrated circuits are improved.

FIG. 4 shows a circuit diagram according to another preferred embodiment of the present invention. As shown in the figure, the inverting charge pump according to the present invention comprises a second pump capacitor 30, a second switching module 32, a fourth switch 34, a fourth buffer 36, a second switching mechanism 38, a second output capacitor 40, and a second driving buffer 42. The difference between the present preferred embodiment and the one in FIG. 3 is that in the preferred embodiment, the fifth switch 34 is coupled between a second terminal of the second pump capacitor 30 and the ground. In addition, the range of voltage level of a switching signal received by the second driving buffer 42 is from the supply voltage VDD to −VCL. Thereby, the inverting charge pump can output a voltage of −VCL. By the preferred embodiment of FIG. 3, it is known that by adjusting the fourth input signal of the fourth switch 34, the fifth input signal of the fifth switch 320, and the sixth input signal of the sixth switch 324 to the first voltage to the second voltage, the supply voltage VDD to −VCL, and the double supply voltage AVDD to the ground (as shown in FIG. 5), respectively, the gate-to-source voltages of the switches are increased as:

$$R_{MOS,34} \propto [(W_{34}/L_{34}) * (V_{GS,34} - Vthn)]^{-1}$$
$$= [(W_{34}/L_{34}) * (AVDD - Vthn)]^{-1}$$
$$= [(W_{34}/L_{34}) * (2 * VDD - Vthn)]^{-1}$$

$$R_{MOS,320} \propto [(W_{320}/L_{320}) * (|V_{GS,320}| - Vthp)]^{-1}$$
$$= [(W_{320}/L_{320}) * (VDD - VCL - Vthp)]^{-1}$$
$$= [(W_{320}/L_{320}) * (2 * VDD - Vthp)]^{-1}$$

$$R_{MOS,324} \propto [(W_{324}/L_{324}) * (V_{GS,324} - Vthn)]^{-1}$$
$$= [(W_{324}/L_{324}) * (AVDD - Vthn)]^{-1}$$
$$= [(W_{324}/L_{324}) * (2 * VDD - Vthn)]^{-1}$$

It is known from the description above that the gate-to-source voltage if the fourth, the fifth, and the sixth switches 34, 320, 324 are increased for reducing the impedance thereof. Thereby, the power efficiency of the charge pump, the output voltage level, and the area efficiency of integrated circuits are improved.

Furthermore, because the power management of the general portable devices adopts more than one charge pump, usually using a doubler charge pump and an inverting charge pump, by utilizing two pump voltages of two charge pumps as the range of voltage levels of the input signals for each other, no extra power supply circuit is needed for the input signals. Thereby, the circuit area and thus costs can be saved.

To sum up, the charge pump capable of enhancing power efficiency and output voltage according to the present invention increases the gate-to-source voltage of the first switch by adjusting the range of voltage levels of the first input signal for the first switch. Hence, the impedance of the first switch is reduced, and the power efficiency of the charge pump, the output voltage level, and the area efficiency of integrated circuits are improved. Besides, by utilizing two pump voltages of two charge pumps as the range of voltage levels of the input signals for each other, no extra power supply circuit is needed for increasing the gate-to-source voltage of the switches. Thereby, the circuit area and thus costs can be saved.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A charge pump capable of enhancing power efficiency and output voltage, comprising:
   a pump capacitor;
   a switching module, coupled to a first terminal of the pump capacitor;
   a first switch, coupled between a second terminal of the pump capacitor and a supply voltage;

a first buffer, receiving a first input signal, producing a control signal for controlling the first switch to turn on or cut off, the range of the voltage levels of the first input signal being between a first voltage and a second voltage, the first voltage and the second voltage relating to the gate-to-source voltage of the first switch, wherein once the first switch is turned on, the gate-to-source voltage of the first switch is a multiple, which is greater than one, of the supply voltage;

a switching mechanism, coupled to the first switch and the pump capacitor for switching the pump capacitor to output a pump voltage; and an output capacitor, coupled to the second switch and the pump capacitor for stabilizing and outputting the pump voltage;

wherein, the switching module further includes:

a second switch, coupled to the supply voltage and the first terminal of the pump capacitor; and a second buffer, coupled to the second switch, receiving a second input signal for controlling the second switch to turn on or cut off, and the voltage levels of the second input signal ranging from the supply voltage to the negative of the supply voltage.

2. The charge pump of claim 1, wherein the switching module further includes:

a third switch, coupled to the ground and the first terminal of the pump capacitor; and a third buffer, coupled to the third switch, receiving a third input signal for controlling the third switch to turn on or cut off, and the voltage levels of the third input signal ranging from twice the supply voltage to the ground.

3. The charge pump of claim 1, wherein the second buffer ii an inverting buffer.

4. The charge pump of claim 1, wherein the second switch is a Metal-Oxide-Semiconductor Field Effective Transistor (MOSFET).

5. The charge pump of claim 2, wherein the third buffer is an inverting buffer.

6. The charge pump of claim 2, wherein the third switch is a MOSFET.

7. The charge pump of claim 1, wherein the first voltage is the pump voltage of the charge pump, and the second voltage is the pump voltage of another charge pump.

8. The charge pump of claim 1, and further comprising a driving buffer, coupled to the switching mechanism, receiving a switching signal, and producing a driving signal for controlling the switching mechanism to turn on or cut off.

9. The charge pump of claim 8, wherein the driving buffer is an inverting buffer.

10. The charge pump of claim 1, wherein the first switch is a MOSFET.

11. A charge pump capable of enhancing power efficiency and output voltage, comprising:

a pump capacitor;

a switching module, coupled to a first terminal of the pump capacitor;

a first switch, coupled between a second terminal of the pump capacitor and the ground;

a first buffer, receiving a first input signal, producing a control signal for controlling the first switch to turn on or cut off, the range of the voltage levels of the first input signal being between a first voltage and a second voltage, the first voltage and wherein once the first switch is turned on, the second voltage relating to the gate-to-source voltage of the first switch, and the gate-to-source voltage of the first switch being a multiple, which is greater than one, of the supply voltage;

a switching mechanism, coupled to the first switch and the pump capacitor for switching the pump capacitor to output a pump voltage; and an output capacitor, coupled to the second switch and the pump capacitor for stabilizing and outputting the pump voltage;

wherein, the switching module further includes:

a second switch, coupled to the supply voltage and the first terminal of the pump capacitor; and a second buffer, coupled to the second switch, receiving a second input signal for controlling the second switch to turn on or cut off, and the voltage levels of the second input signal ranging from the supply voltage to the negative of the supply voltage.

12. The charge pump of claim 11, wherein the switching module further includes:

a third switch, coupled to the ground and the first terminal of the pump capacitor; and a third buffer, coupled to the third switch, receiving a third input signal for controlling the third switch to turn on or cut off, and the voltage levels of the third input signal ranging from twice the supply voltage to the ground.

13. The charge pump of claim 11, wherein the second buffer is an inverting buffer.

14. The charge pump of claim 11, wherein the second switch is a Metal-Oxide-Semiconductor Field Effective Transistor (MOSFET).

15. The charge pump of claim 12, wherein the third buffer is an inverting buffer.

16. The charge pump of claim 12, wherein the third switch is a MOSFET.

17. The charge pump of claim 11, wherein the first voltage is the pump voltage of the charge pump, and the second voltage is the pump voltage of another charge pump.

18. The charge pump of claim 11, and further comprising a driving buffer, coupled to the switching mechanism, receiving a switching signal, and producing a driving signal for controlling the switching mechanism to turn on or cut off.

19. The charge pump of claim 18, wherein the driving buffer is an inverting buffer.

20. The charge pump of claim 11, wherein the first switch is a MOSFET.

21. A charge pump capable of enhancing power efficiency and output voltage, comprising a first charge pump and a second charge pump, the first charge pump including:

a first pump capacitor;

a first switching module, coupled to a first terminal of the first pump capacitor;

a first switch, coupled between a second terminal of the first pump capacitor and a supply voltage;

a first buffer, receiving a first input signal, producing a first control signal for controlling the first switch to turn on or cut off, the range of the voltage levels of the first input signal being between a first voltage and a second voltage, the first voltage and the second voltage relating to the gate-to-source voltage of the first switch, end wherein once the first switch is turned on, the gate-to-source voltage of the first switch being a multiple, which is greater than one, of the supply voltage;

a first switching mechanism, coupled to the first switch and the first pump capacitor for switching the first pump capacitor to output a first pump voltage;

a first output capacitor, coupled to the second switch and the first pump capacitor for stabilizing and outputting the first pump voltage the second charge pump including:

a second pump capacitor;

a second switching module, coupled to a first terminal of the second pump capacitor;

a second switch, coupled between a second terminal of the second pump capacitor and the ground;

a second buffer, receiving a second input signal, producing a second control signal for controlling the second switch to turn on or cut off, the range of the voltage levels of the second input signal being between the first voltage and the second voltage, the first voltage and the second voltage relating to the gate-to-source voltage of the second switch, wherein once the second switch is turned on, the gate-to-source voltage of the second switch being a multiple, which is greater than one, of the supply voltage;

a second switching mechanism, coupled to the second switch and the second pump capacitor for switching the second pump capacitor to output a second pump voltage; and a second output capacitor, coupled to the second switch and the second pump capacitor for stabilizing and outputting the second pump voltage;

wherein the first voltage ii the first pump voltage of the first charge pump, and the second voltage ii the second pump voltage of the second charge pump.

22. The charge pump of claim 21, wherein the first switching module further includes:

a third switch, coupled to the supply voltage and the first terminal of the first pump capacitor; and a third buffer, coupled to the third switch, receiving a third input signal for controlling the third switch to turn on or cut off, and the voltage levels of the third input signal ranging from the supply voltage to the negative of the supply voltage.

23. The charge pump of claim 21, wherein the first switching module further includes:

a fourth switch, coupled to the ground and the first terminal of the first pump capacitor; and a fourth buffer, coupled to the fourth switch, receiving a fourth input signal for controlling the fourth switch to turn on or cut off, and the voltage levels of the fourth input signal ranging from twice the supply voltage to the ground.

24. The charge pump of claim 21, wherein the second switching module further includes:

a fifth switch, coupled to the supply voltage and the first terminal of the second pump capacitor; and a fifth buffer, coupled to the fifth switch, receiving a fifth input signal for controlling the fifth switch to turn on or cut off, and the voltage levels of the fifth input signal ranging from the supply voltage to the negative of the supply voltage.

25. The charge pump of claim 21, wherein the second switching module further includes:

a sixth switch, coupled to the ground and the first terminal of the second pump capacitor; and a sixth buffer, coupled to the sixth switch, receiving a sixth input signal for controlling the sixth switch to turn on or cut off, and the voltage levels of the sixth input signal ranging from twice the supply voltage to the ground.

26. The charge pump of claim 21, wherein the first charge pump further comprising a first driving buffer, coupled to the first switching mechanism, receiving a first switching signal, and producing a first driving signal for controlling the first switching mechanism to turn on or cut off.

27. The charge pump of claim 21, wherein the second charge pump further comprising a second driving buffer, coupled to the second switching mechanism, receiving a second switching signal, and producing a second driving signal for controlling the second switching mechanism to turn on or cut off.

* * * * *